United States Patent [19]

Knoth

[11] Patent Number: 5,561,949

[45] Date of Patent: Oct. 8, 1996

[54] TIE-DOWN STRAP FOR BUILDING TRUSS

[75] Inventor: Wayne M. Knoth, Belmont, Mich.

[73] Assignee: Universal Forest Products, Inc., Grand Rapids, Mich.

[21] Appl. No.: 320,167

[22] Filed: Oct. 7, 1994

[51] Int. Cl.$^6$ .................................................. E04B 7/04
[52] U.S. Cl. ........................... 52/92.2; 52/93.1; 52/93.2; 52/714; 52/643; 52/745.16; 52/745.17; 403/232.1
[58] Field of Search .................................... 52/92.1, 92.2, 52/92.3, 93.1, 93.2, 712, 714, 702, 639, 643, 745.01, 745.02, 745.16, 745.17; 403/232.1

[56] References Cited

U.S. PATENT DOCUMENTS

| | | |
|---|---|---|
| 2,078,968 | 5/1937 | Patterson ............................... 52/639 X |
| 2,143,420 | 1/1939 | Livermore .............................. 52/639 X |
| 3,293,808 | 12/1966 | Duncan .................................... 52/92.2 |
| 3,425,720 | 2/1969 | Spane . |
| 4,411,547 | 10/1983 | Johnson . |
| 4,713,923 | 12/1987 | Sielaff et al. . |
| 5,257,483 | 11/1993 | Netek . |
| 5,303,520 | 4/1994 | Gozdziak . |
| 5,311,708 | 5/1994 | Frye . |

FOREIGN PATENT DOCUMENTS

| | | | |
|---|---|---|---|
| 1458233 | 10/1966 | France | ..................................... 52/92.2 |
| 166277 | 2/1959 | Sweden | ................................... 52/92.1 |

OTHER PUBLICATIONS

Simpson Strong–Tie Company, Inc., Seismic and Hurricane Anchors, 1991.
Kent–Sag, Rafter Tie/Truss Tie, RT Series.

*Primary Examiner*—Wynn E. Wood
*Assistant Examiner*—Aimee E. McTigue
*Attorney, Agent, or Firm*—Varnum, Riddering, Schmidt & Howlett LLP

[57] ABSTRACT

A truss and tie-down strap assembly for use in conventional building structures are shown. The strap provides direct mounting of the truss to the wall studs to provide increased mounting strength for the roof assembly to the side walls of a structure. One leg of the flexible strap is mounted to the truss assembly and the other leg of the flexible strap is mounted to the top plate and stud assembly. The strap is formed of a flexible material such that it can be easily deformed to accommodate different truss structures and side wall configurations. A truss and tie-down strap according to the invention can be preassembled at one location and mounted to the top plate and wall stud assembly at a separate location.

21 Claims, 6 Drawing Sheets

TIE-DOWN STRAP FOR BUILDING TRUSS

BACKGROUND OF THE INVENTION

1. Field of the Invention

This invention relates to a truss assembly for the framework of a building and, more particularly, to a pre-assembled truss having a tie-down strap for securing the truss to the wall studs.

2. Description of Related Art

The structural framework of a conventional structure typically comprises a plurality of wall studs spaced from one another, a horizontal top plate extending along the top edge of each of the wall studs and a plurality of roof trusses mounted to the top plate or studs. Roof trusses must be securely mounted to the wall stud or top plate to mount the roof assembly to the wall assembly. A particular problem in climatic regions subject to severe winds is the shearing off of the roof assembly from the wall assembly during high wind storms or hurricanes. This is a particular problem for homes and other structures in the coastal regions of the United States which are periodically hit by hurricanes and tropical depressions.

Government regulations and standards for manufactured homes for use in regions subject to hurricanes now require all roof trusses to be tied directly to the wall studs by enhanced means. Therefore, some means for directly tying the truss assembly to the wall studs is needed.

In the past, relatively complicated brackets and bracket assemblies have been developed to mount the truss assembly to the wall stud. Examples of such known assemblies are seen in U.S. Pat. No. 3,425,720 issued Jul. 25, 1966 to Spane; U.S. Pat. No. 5,311,708 issued May 17, 1994 to Frye; U.S. Pat. No. 5,257,483 issued Nov. 2, 1993 to Netek; U.S. Pat. No. 5,303,520 issued Apr. 19, 1994 to Gozdziak; and U.S. Pat. No. 4,411,547 issued Oct. 25, 1983 to Johnson. Another example of a complicated bracket is commercially available from Simpson Strong-Tie Company, Inc. and comprises a rigid, galvanized steel bracket which is stamped and bent into a particular shape to provide means for securing the upper rafter to the wall stud and top plate for a particular roof configuration.

One problem which each of the known strap assemblies suffer from is difficulty in securing the bracket to the truss, top plate and wall stud. Another significant problem that the known structures suffer from is that the several tie-down means are not easily adapted to differing structural orientation of the truss assembly and the wall stud. Therefore, suppliers would need to maintain a large inventory of several different brackets and the like to accommodate the varying structures being built.

SUMMARY OF THE INVENTION

The pre-assembled truss and tie-down strap according to the invention overcomes the problems of the prior art in that the strap can be quickly and easily mounted to both the truss assembly and the wall stud and a single tie-down strap according to the invention can be adapted for use in a wide variety of angular orientations or roof pitches or truss structures, thereby eliminating the need for brackets of differing size or angle for more complicated roof structures.

In one embodiment, a truss adapted to be mounted to a wall stud assembly comprises a top chord, a bottom chord, at least one intermediate support member and a tie-down strap. The top chord has a lower surface, an overhang portion and a clearspan portion. The overhang portion extends outwardly beyond the wall stud assembly and the clearspan portion is located inwardly from the wall stud assembly when the truss is mounted thereto. The bottom chord has an upper surface and an overhanging end. The at least one intermediate support member is mounted by fasteners to both of the top chord and bottom chord to mount at least a portion of the top chord and the bottom chord in a spaced relation. The tie-down strap is formed of a flexible material and has a first portion and a second portion. The first portion is mounted by fasteners to one of the lower surface of the clearspan portion of the top chord or the upper surface of the clearspan portion of the bottom chord. The second portion is free for mounting to the wall stud framework. With this particular structure, the tie-down strap directly mounts the truss to the wall stud assembly.

In another embodiment, the invention comprises a building framework having a plurality of vertical wall studs, a top plate mounted to the top of the wall studs and a truss received on the upper surface of the top plate. The truss comprises a top chord, a bottom chord, at least one intermediate support member and a tie-down strap formed of a flexible material. The at least one intermediate support member is mounted by fasteners to both of the top chord and bottom chord to mount at least a portion of the top chord and bottom chord in a spaced relation. The tie-down strap has a first portion and a second portion. The first portion is mounted by fasteners to one of the lower surface of the clearspan portion of the top chord or the upper surface of the clearspan portion of the bottom chord. The second portion of the tie-down strap is mounted to one of the plurality of wall studs. With this particular structure, the tie-down strap directly mounts the truss to a wall stud.

The invention also encompasses a method of assembling a roof truss and wall stud framework. The method comprises the steps of providing a top chord, a bottom chord, at least one intermediate support member and a tie-down strap. The tie-down strap has a first portion and a second portion. The first portion of the tie-down strap is mounted to one of the top chord and bottom chord by at least one fastener. The truss is assembled, at a first location, from the top chord, bottom chord and intermediate support member. Then the truss is transported to a second location and mounted to the wall stud framework. The second portion of the tie-down strap is manipulated such that it overlies at least a portion of the wall stud framework. Finally, the second portion of the tie-down strap is mounted to the wall stud framework.

BRIEF DESCRIPTION OF THE DRAWINGS

The invention will now be described with reference to the drawings wherein.

DESCRIPTION OF THE PREFERRED EMBODIMENTS

Figure 1:
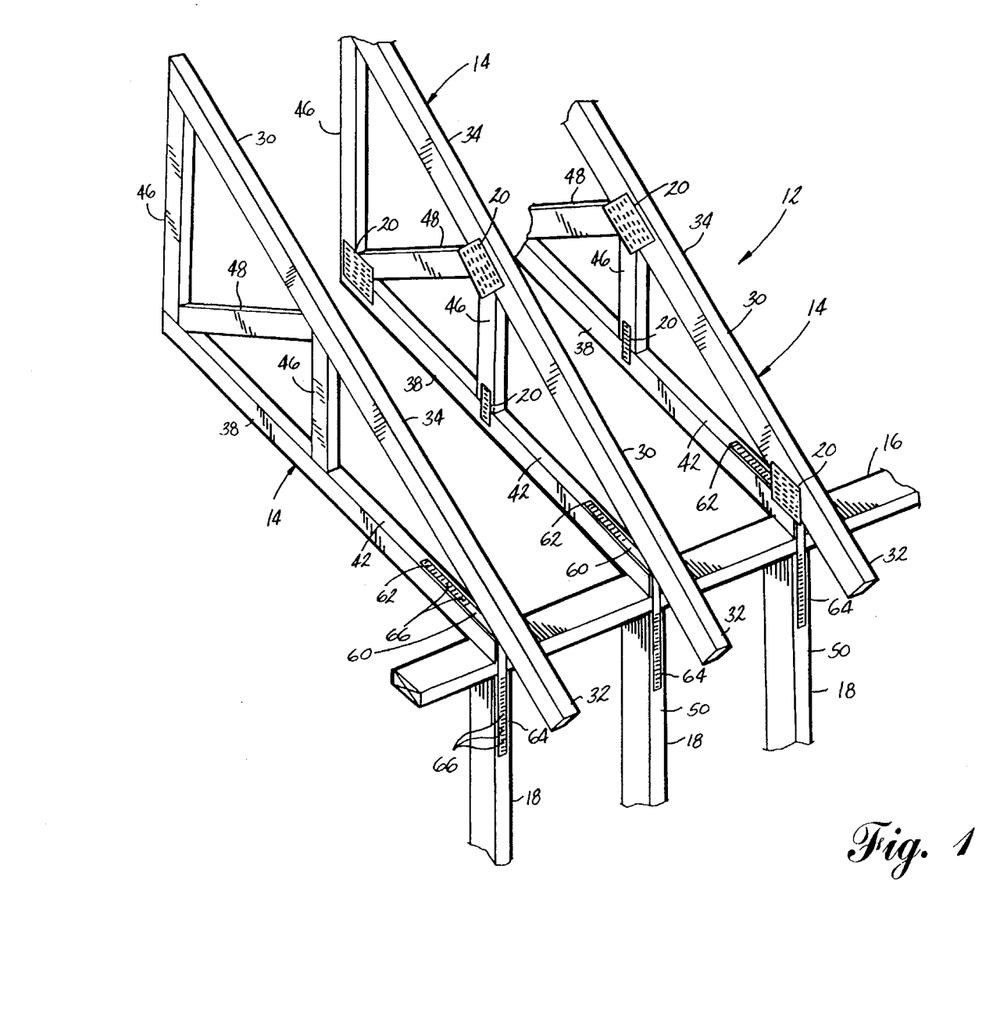
FIG. 1 is a perspective view of a portion of the structural framework for a building including a first embodiment of a tie-down strap and truss assembly according to the invention.
Figure 2:
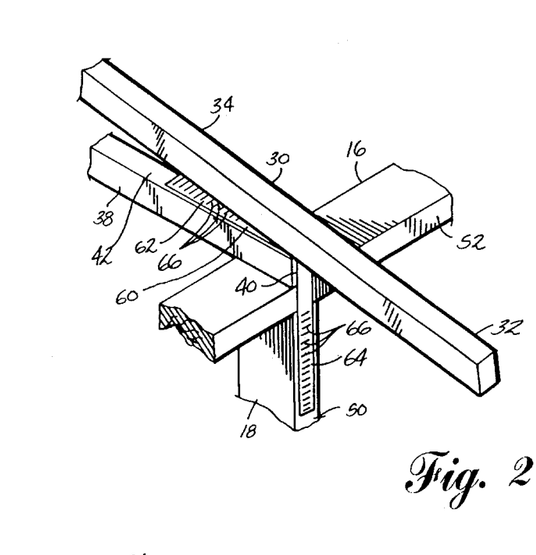
FIG. 2 is a perspective view of the detail of the tie-down strap and truss assembly as seen in FIG. 1.
Figure 3:
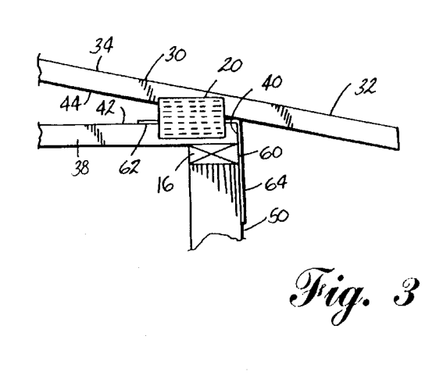
FIG. 3 is a side elevational view of the tie-down strap and truss assembly as seen in FIG. 1.

Referring now to the drawings and to FIGS. 1–3 in particular, a first embodiment of a pre-assembled truss and tie-down strap according to the invention is shown incorporated into the framework of a conventional structure. The structural framework 12 of a conventional building comprises a truss 14 which is received on top of a horizontally extending top plate 16. The top plate 16 is mounted to the top edges of a plurality of studs 18 by conventional fasteners.

One embodiment of a conventional truss 14 comprises a top chord 30 which extends upwardly at an acute angle from a horizontal bottom chord 38. In the first embodiment, the top chord comprises an overhang portion 32 and a clearspan portion 34. The top chord 30 is maintained in the spaced relationship from the bottom chord 38 by a plurality of vertical support members 46 and one or more angled support members 48. The several elements of the truss 14 can be assembled through the use of nails or, as seen in FIG. 1, through the use of conventional spiked gusset plates 20. Traditionally, gusset plates 20 are mounted at each juncture of the several elements of the truss 14. However, several of the gusset plates 20 have been excluded from FIG. 1 and the remaining drawings for the purpose of adequately showing the tie-down strap according to the invention.

The tie-down strap 60 according to the invention comprises an upper leg 62 and a lower leg 64. In the first embodiment, as seen in FIG. 1, the upper leg 62 of the strap 60 is mounted to the top surface 42 of the bottom chord 38 and the lower leg 64 of the strap 60 is mounted to the outside surface 50 of the wall stud 18. The upper and lower legs 62, 64 of the tie-down strap 60 are secured to the truss 14 and stud 18 by conventional fasteners such as nails or staples. However, any means for securely mounting the strap 60 to the truss 14 and studs 18 falls within the scope of the invention.

As seen in FIGS. 1–3, the tie-down strap 60 securely mounts the truss 14 to each wall stud 18. The tie-down strap 60 creates additional means for directly mounting the truss 14 and roof assembly to the walls of a building. Therefore, it is less likely that the roof assembly will be severed from the walls in the event of high winds.

The tie-down strap 60 is preferably formed from flexible, easily deformable galvanized steel, preferably 22 gauge steel. Steel of this thickness can be easily deformed by hand by virtually any worker to match the contours of the particular truss and wall stud assembly.

It is standard in the construction industry that a truss would be preassembled at a first location, such as a manufacturing facility, and then delivered to a second location, such as a construction site or a manufactured home assembly facility, for mounting to the framed side walls. The tie-down strap according to the invention is ideally suited for this standard construction procedure and creates a simple method of directly mounting the truss to the wall stud. The truss 14 having a tie-down strap 60 according to the invention can be assembled at a first location. During the assembly of the truss 14, the upper leg 62 of the tie-down strap 60 is mounted to the top surface 42 of the bottom chord 38 by conventional fasteners 66. The lower leg 64 of the strap 60 remains free, or can be temporarily secured to the bottom surface 44 of the top chord 30 for shipment to the construction site or assembly facility. When the truss is received at the construction site or assembly facility, the truss 14 is placed on top of the stud 18 and top plate 16 assembly and then the lower leg 64 of the strap 60 is securely mounted to the outside surface 50 of the stud 18 by fasteners 66. Because the strap 60 is preferably formed of a flexible, hand deformable metal, the lower leg 64 of the strap 60 can be easily manipulated, without requiring special tools or a large amount of force, to the desired position for mounting to the top plate 16 or stud 18.

Figure 11:
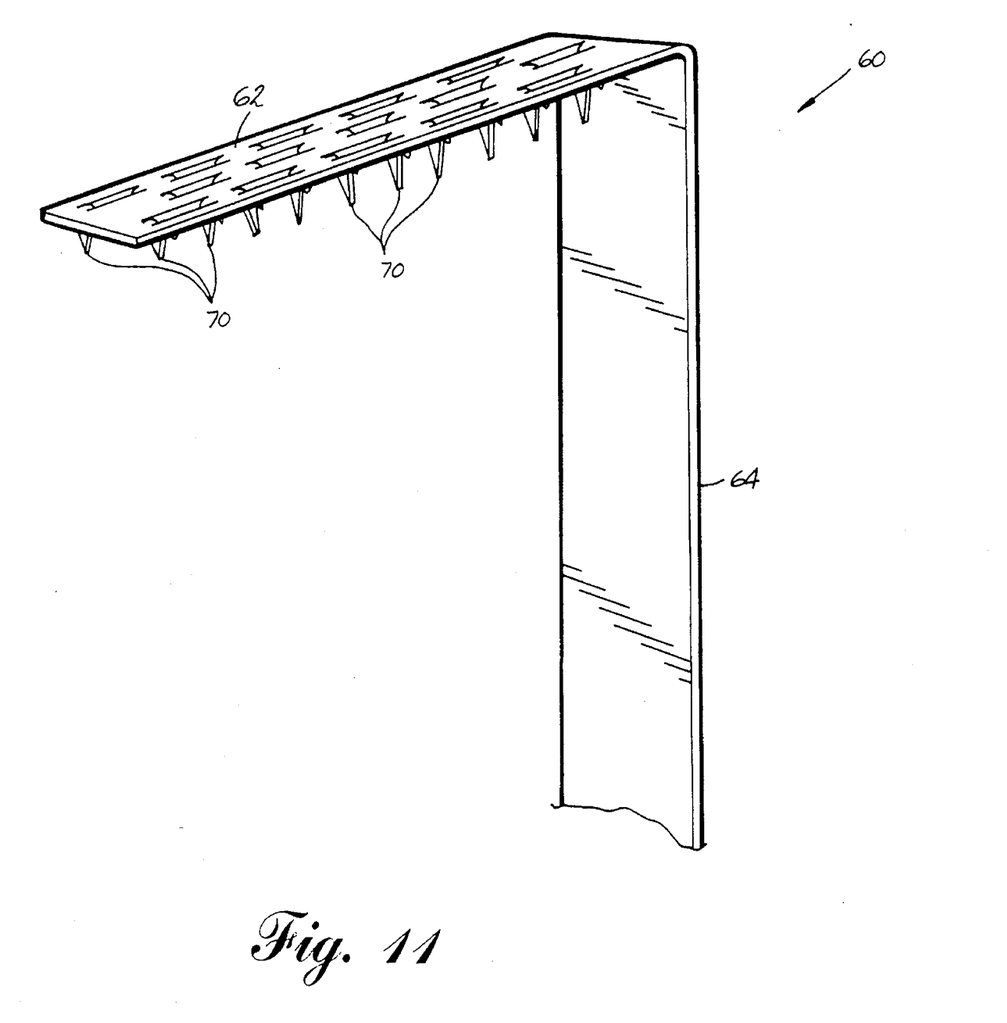
FIG. 11 is a perspective view of a tie-down strap according to the invention having preformed teeth.

While the preferred embodiment of the strap is formed from 22 gauge galvanized steel, the strap can be formed from metal in the range of 14 to 26 gauge. With this particular structure, the fasteners 66 used to mount the strap 60 can be any conventional fastener including, but not limited to, nails, screws or staples. Alternatively, the strap can have a plurality of preformed teeth stamped therein for mounting the strap to the wood products. An example of a strap 60 having such preformed teeth is seen in FIG. 11. The preformed teeth 70 can be formed in both the upper 62 and lower legs 64, or only one of the two legs with other fasteners being used for mounting the remaining leg. Any combination of fasteners can be used depending upon the particular application.

Preferably, the strap fasteners are staples which are mounted using a conventional air or spring powered staple gun. As seen in FIGS. 2 and 3, the lower leg 64 of the strap 60 of the first embodiment extends along the end surface 40 of the chord 38, the outside surface 52 of the top plate 16 and the outside surface 50 of the stud 18. The fasteners can be received anywhere along the length of the strap 60.

Figure 4:
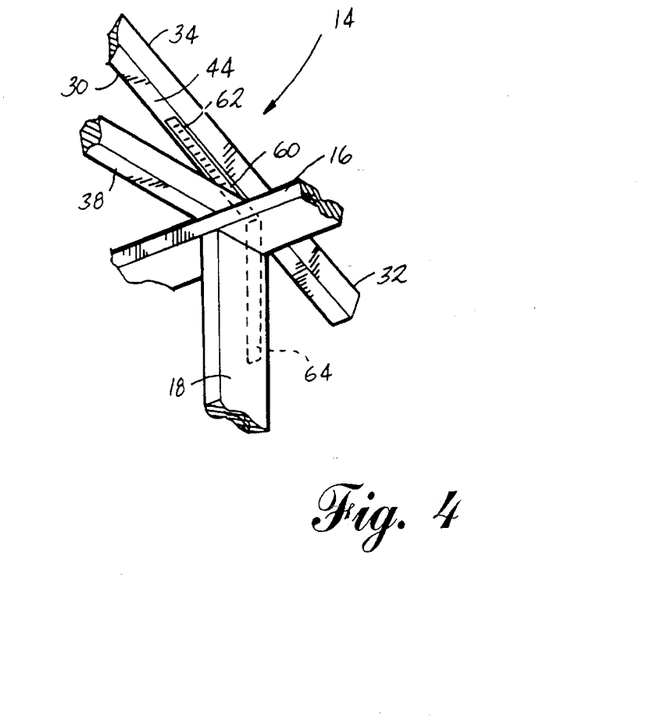
FIG. 4 is a lower perspective view of a second embodiment of the tie-down strap and truss assembly according to the invention.

FIG. 4 is a perspective view of a second embodiment of the tie-down strap according to the invention. Reference numerals from the first embodiment will be repeated for similar elements in all subsequent embodiments.

In the second embodiment seen in FIG. 4, the upper leg 62 of the strap 60 is mounted to the bottom surface 44 of the top chord 30 by conventional fasteners 66. As in the other embodiments, the lower leg 64 of the strap 60 is mounted to the outside surface 50 of the stud 18. The primary distinction between the second embodiment and the first, is that the upper leg of the strap 62 is mounted to the top chord 30 rather than the bottom chord 38, as seen in FIGS. 1–3. Similar to the earlier embodiment, the truss can be preassembled with the upper leg 62 of the strap 60 mounted to the top chord 30 at a first location and the lower leg 64 either remaining free or being temporarily secured to a portion of the truss such as the overhang portion 32 of the top chord 30 or the bottom chord 38 until the truss 14 is received on the wall stud framework.

Figure 5:
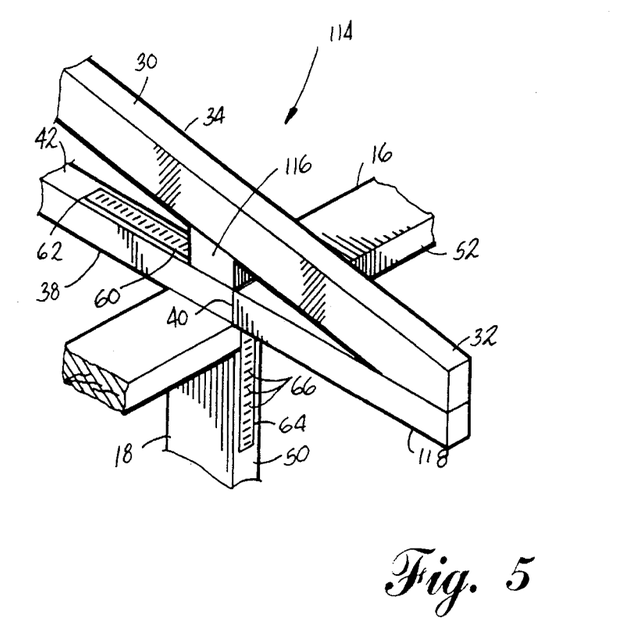
FIG. 5 is a perspective view of a third embodiment of the tie-down strap and truss assembly according to the invention.

As seen in FIG. 5, a third embodiment of a truss incorporating a tie-down strap 60 according to the invention is shown. In this embodiment the truss is a cantilever truss 114 which comprises a top chord 30 extending upwardly at an acute angle from the bottom chord 38. A web member 116 is mounted between the top chord 30 and bottom chord 38 to space these two members from one another. A cantilever member 118 extends outwardly from the end surface 40 of the chord 38 to the end of the top chord 30. The incorporation of the web member 116 and cantilever member 118 into the truss 114 creates a substantially horizontal cantilever surface for the overhanging portion 32 of the top chord 30. Although not shown in FIG. 5, the web member 116 and cantilever member 118 are mounted in the cantilever truss 114 by conventional means such as a spiked gusset plate.

As in the first embodiment, the upper leg 62 of the tie-down strap 60 is mounted to the top surface 42 of the chord 38 and the lower leg 64 of the strap 60 is mounted to the outside surface 50 of the stud 18. A portion of the upper leg 62 of the strap 60 is received between the bottom surface of the web member 116 and the top surface 42 of the chord 38. Similarly, a portion of the lower leg 64 of the strap 60 is received between the end surface of the chord 40 and the end surface of the cantilever member 118.

As with the other embodiments, the upper leg 62 of the strap 60 can be assembled with the other elements of the truss at a first location and shipped to a second location for assembly with the wall structure. During shipment of a preassembled cantilever truss 114, the lower leg 64 of the strap 60 can be temporarily secured to the lower surface of the cantilever member 118 or to the lower surface of the chord 38. When the cantilever truss 114 is to be assembled to the top plate 16 and stud 18, the lower leg 64 of the strap 60 can be easily manipulated by hand to lie along the outside surface 50 of the stud 18 and then secured thereto by fasteners 66.

Figure 6:
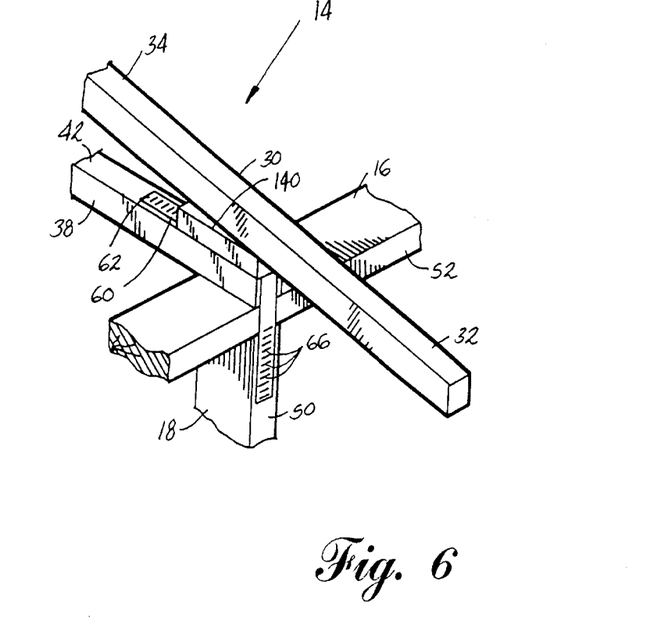
FIG. 6 is a perspective view of a fourth embodiment of the tie-down strap and truss assembly according to the invention.

FIG. 6 is a perspective view of a fourth embodiment of the truss assembly according to the invention. In this embodiment, a spacer block 140 is mounted between the bottom surface of the top chord 30 and the top surface 42 of the chord 38. Preferably, the upper leg 62 of the strap 60 is mounted between the spacer block 140 and the top surface 42 of the chord 38. The spacer block 140 effectively raises the top chord relative to the bottom chord and decreases the pitch of the roof truss.

Figure 7:
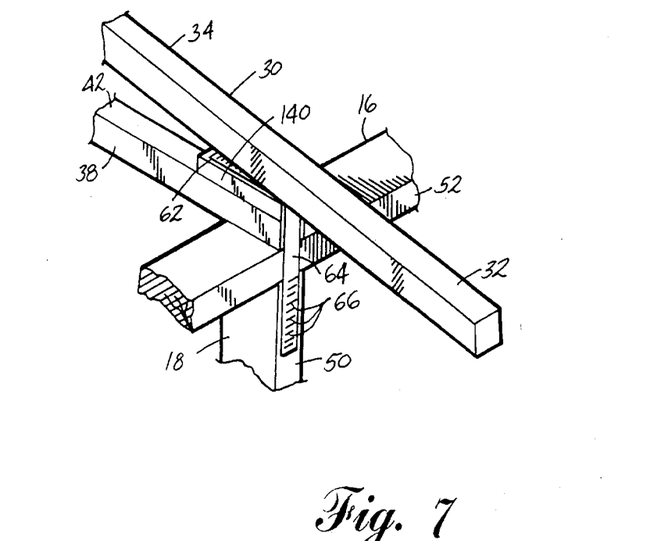
FIG. 7 is a perspective view of a fifth embodiment of the tie-down strap and truss assembly according to the invention.

FIG. 7 is a fifth embodiment showing a variation of the spacer block truss seen in FIG. 6. In this embodiment, the upper leg 62 of the strap 60 is secured to a top surface of the spacer block 140. As in the earlier embodiments, the lower leg 64 of the strap can remain free after the truss 14 has been preassembled until the truss is mounted to the wall stud assembly. In this embodiment, the lower leg 64 of the strap 60 extends along an end surface of the spacer block 140, the end surface 40 of the chord 38, the outside surface 52 of the top plate 18 and is mounted to the outside surface 50 of the stud 18.

Figure 8:
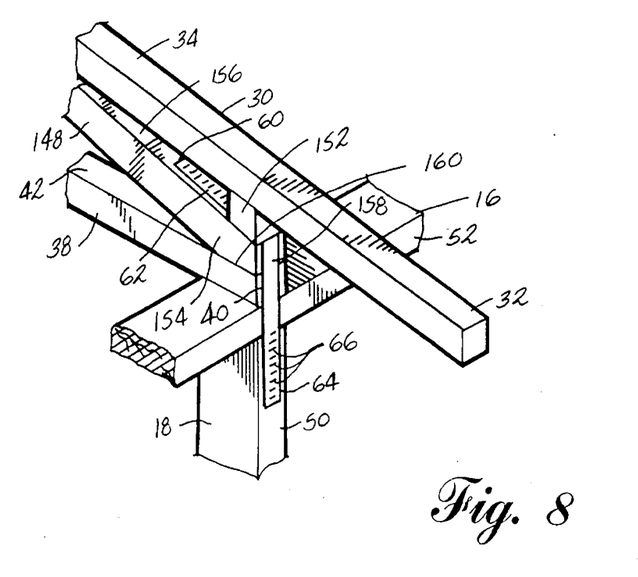
FIG. 8 is a perspective view of a sixth embodiment of the tie-down strap and truss assembly according to the invention.
Figure 9:
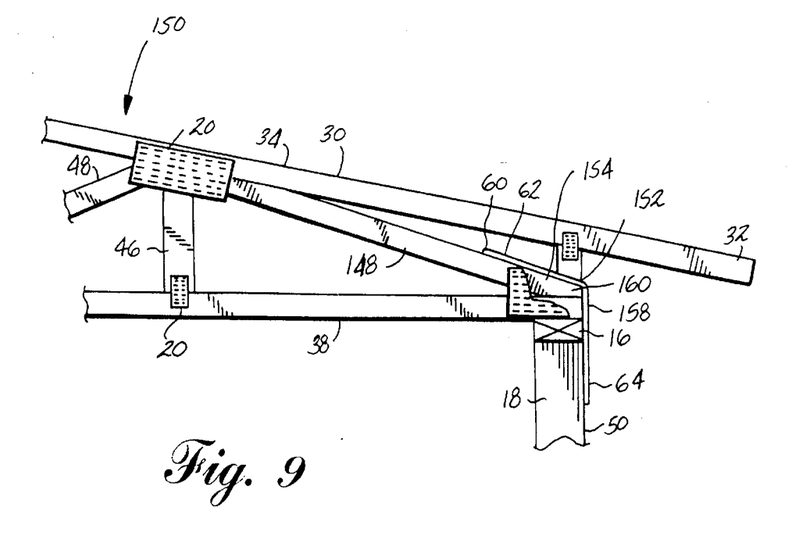
FIG. 9 is a side elevational view of the sixth embodiment of the tie-down strap and truss assembly as seen in FIG. 8.

FIGS. 8 and 9 show a sixth embodiment of the truss according to the invention. In this embodiment, the truss 150 comprises a top chord 30, a bottom chord 38, at least one vertical support member 46 and a plurality of angled support members 48. A web member 152 is mounted adjacent the top plate 16 between the top chord 30 and the bottom chord to space the top chord 30 from the bottom chord 38. A supplementary support member 148 is mounted between the top chord 30 and the bottom chord 38. An outside end 154 of the supplementary support member 148 is adjacent the web member 152 and the top surface 42 of the chord 38. As is conventional, these several elements are held in fixed relation by a spiked gusset plate 20 or other conventional means. In this embodiment, the upper leg 62 of the strap 60 is mounted to a top surface 156 of the supplementary support member 148. The upper leg 62 also extends along the bottom surface 160 of the web member 152, the end surface 158 of the supplementary support member 140, the end surface 40 of the chord 38 and the outside surface 50 of the stud 18. As in the third embodiment, the web member 152 raises the top chord 30 relative to the bottom chord 38 to reduce the pitch of the roof and the angled support member 148 provides additional strength and rigidity for the truss 150. As in the earlier embodiments, the truss 150 and tie-down strap 60 can be preassembled at one location and then mounted to the stud 18 and top wall 16 assembly at a separate location.

Figure 10:
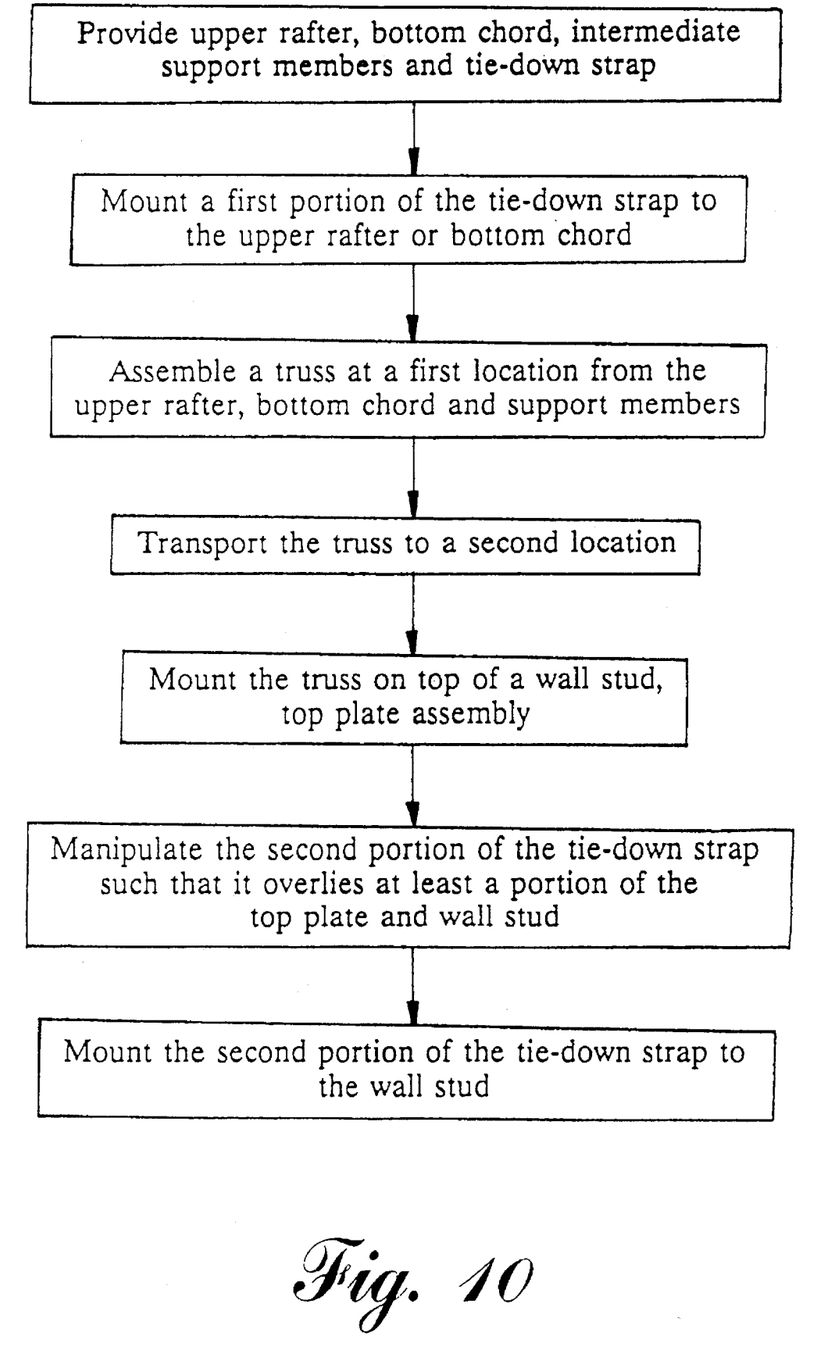
FIG. 10 is a schematic view of a method for assembling a roof truss according to the invention.

FIG. 10 is a schematic drawing of a method for assembling a roof truss and wall stud framework according to the invention. As described above, the truss elements comprising the top chord, bottom chord, intermediate support members and tie-down strap are provided at a first location, including, but not limited to a truss assembly facility, manufactured housing assembly facility or construction site. A first portion of the tie-down strap is mounted to the top chord or bottom chord. The truss is assembled at the first location from the provided elements. The assembled truss is transported to a second location and mounted on top of a wall stud and top plate assembly. The second location includes, but is not limited to a manufactured housing assembly facility or a construction site. Next, the second portion of the tie-down strap can be easily manipulated, by hand, such that it overlies at least a portion of the top plate and wall stud. Finally, the second portion of the tie-down strap is mounted to the wall stud by conventional fasteners. Preferably, an air-operated staple gun is used to mount the first and second portions of the tie-down strap to the truss and wall stud framework. However, when the tie-down strap has preformed teeth 70 (FIG. 21) stamped therein, the upper leg of the strap can be mounted to the truss assembly by a conventional press machine to force the teeth into the truss framework and the lower leg can be mounted to the wall stud by other fasteners such as staples or nails. If the teeth 70 are also formed in the second portion of the strap, the strap can be mounted to the wall stud by a hammer. The strap can be fastened to the truss assembly and wall stud by any combination of preformed teeth, nails, screws, staples, adhesive and the like.

While the method of assembling a roof truss and wall stud assembly is described as being performed at two different locations, these two locations do not need to be located miles apart. For example, the roof truss can be assembled at one location or workstation within a manufactured home assembly plant and then transported to a different location or workstation in the same assembly facility for mounting to a wall stud assembly. Similarly, the roof truss can be assembled at one location within a construction site and transported to a different location in the same construction site for mounting to the wall stud framework.

One advantage realized by the method according to the invention is that the second portion of the tie-down strap can be temporarily secured to the roof truss as the truss is transported from the first to the second location, thereby minimizing the potential for damage to the tie-down strap or workers during transportation of the truss. When the assembled truss arrives at the second location for mounting to the wall stud assembly, the tie-down strap is already an integral part of the truss and therefore is not a separate component of the assembly which can get lost, misplaced or damaged. In addition, there is no need to maintain an inventory of tie-down straps at the second location because the tie-down strap is already an integral part of the truss assembly.

The tie-down strap and truss assembly according to the invention provides significant advantages over the known truss assemblies of the prior art. Namely, the truss assembly and tie-down strap according to the invention greatly simplifies the assembly of a prefabricated truss to the top plate and stud framework. Through the use of a flexible material, virtually any worker can deform the strap into the proper position for mounting to the studs and top plate. Therefore, the advantages of a preassembled truss, minimal part cost and the increased strength for the roof structure through the use of the tie-down strap and truss assembly according to the invention are realized. In addition, a single strap design can be incorporated into a wide variety of truss structures thereby minimizing cost for the tie-down strap.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. An improved preassembled truss comprising a top chord having a lower surface and an overhanging end, a bottom chord having an upper surface facing the top chord lower surface and an outer end, at least one intermediate support element mounted by fasteners to both of the top chord and bottom chord and spaced from the outer end of the bottom chord to mount at least a portion of the top chord and bottom chord in a spaced relation, the improvement comprising:
    a tie-down strap formed of a flexible material having a first portion and a second portion, the first portion being mounted between the top chord lower surface and the bottom chord upper surface by fasteners to one of the lower surface of the top chord or the upper surface of the bottom chord, the second portion being free for mounting to a wall framework;
    whereby, the truss and first portion of the tie-down strap is adapted to be preassembled at a first location and then the preassembled truss and strap assembly are adapted to be mounted through the second portion of the tie-down strap and fasteners to a wall framework at a second location.

2. An improved preassembled truss according to claim 1 wherein the tie-down strap is formed of galvanized steel.

3. An improved preassembled truss according to claim 1 wherein the tie-down strap is formed of galvanized steel having a thickness in the range of 14 to 26 gauge.

4. An improved preassembled truss according to claim 1 and further comprising a spacer member having an upper and lower surface, the spacer member being mounted between the outer end of the bottom chord and the top chord, the first portion of the tie-down strap being mounted to one of the upper surface of the spacer member and the upper surface of the bottom chord.

5. An improved preassembled truss according to claim 1 and further comprising a cantilever member having a first end mounted to the overhanging end of the top chord and a second end mounted to the outer end of the bottom chord, the second portion of the tie-down strap being received between the second end of the cantilever member and the outer end of the bottom chord.

6. An improved preassembled truss according to claim 5 and further comprising a spacer member mounted between the outer end of the bottom chord and the top chord, the first portion of the tie-down strap being received between the spacer member and one of the bottom chord and the top chord.

7. A truss adapted to be mounted to a wall stud assembly, the truss comprising;
    a top chord having a lower surface, an overhang portion and a clearspan portion, the overhang portion adapted to extend outwardly beyond the wall stud assembly and the clearspan portion being adapted to lie located inwardly from the wall stud assembly when the truss is mounted thereto;
    a bottom chord having an upper surface facing the top chord lower surface and an outer end;
    at least one intermediate support member mounted by fasteners to both of the top chord and bottom chord to mount at least a portion of the top chord and bottom chord in a spaced relation; and
    a tie down strap formed of a flexible material having a first portion and a second portion, the first portion being mounted between the top chord lower surface and the bottom chord upper surface by fasteners to one of the lower surface of the clearspan portion of the top chord or the upper surface of the bottom chord, the second portion being free for mounting to the wall stud framework;
    whereby the tie-down strap is adapted for directly mounting the truss to the wall stud assembly.

8. A truss according to claim 7 wherein the tie-down strap is formed of galvanized steel.

9. A truss according to claim 7 wherein the tie-down strap is formed of galvanized steel having a thickness in the range of 14 to 26 gauge.

10. A truss according to claim 7 and further comprising a spacer member having an upper and lower surface, the spacer member being mounted between the outer end of the bottom chord and the top chord the first portion of the tie-down strap being mounted to one of the upper surface of the spacer member and the upper surface of the bottom chord.

11. A truss according to claim 7 and further comprising a cantilever member having a first end mounted to the overhang portion of the top chord and a second end mounted to the outer end of the bottom chord, the second portion of the tie-down strap being received between the second end of the cantilever member and the outer end of the bottom chord.

12. A truss according to claim 11 and further comprising a spacer member mounted between the outer end of the bottom chord and the top chord, the first portion of the tie-down strap being received between the spacer member and one of the bottom chord and the top chord.

13. A building framework comprising;
    a plurality of vertical wall studs having an outside surface and a top edge;
    a top plate having an upper surface, the top plate being mounted to the top edge of at least a portion of the plurality of wall studs;
    a truss received on the upper surface of the top plate, the truss comprising:
    a top chord having a clearspan portion with a lower surface and an overhang portion, the overhang portion extending outwardly beyond the said portion of the plurality of wall studs and the clearspan portion being located inwardly from said portion of the plurality wall studs when the truss is mounted to the top plate;

a bottom chord having a clearspan portion with an upper surface facing the lower surface of the clearspan portion of the top chord and an outer end;

at least one intermediate support member mounted by fasteners to both of the top chord and bottom chord to mount at least a portion of the top chord and bottom chord in a spaced relation; and a tie down strap formed of a flexible material having a first portion and a second portion, the first portion being mounted between the top chord clearspan lower surface and the bottom chord clearspan upper surface by fasteners to one of the lower surface of the clearspan portion of the top chord or the upper surface of the clearspan portion of the bottom chord, the second portion being mounted to one of said plurality of wall studs;

whereby the tie-down strap directly mounts the truss to the wall stud.

14. An improved preassembled truss according to claim 13 wherein the tie-down strap is formed of galvanized steel having a thickness such that the tie-down strap can be easily manipulated by hand to a desired configuration.

15. A method of assembling a roof truss and wall stud framework comprising the steps of:

providing a top chord with a lower surface, a bottom chord with an upper surface, at least one intermediate support member and a tie-down strap, the tie-down strap having a first and second portion;

positioning the top chord and the bottom chord so that the top chord lower surface faces the bottom chord upper surface;

positioning the first portion of the tie-down strap between the top and bottom chords;

mounting the first portion of the tie-down strap to one of the top chord and the bottom chord by at least one fastener;

assembling the truss, from the top chord, bottom chord and intermediate support member at a first location;

transporting the truss to a second location;

mounting the truss to the wall stud framework;

manipulating the second portion of the tie-down strap such that it overlies at least a portion of the wall stud framework; and mounting the second portion of the tie-down strap to the wall stud framework.

16. A method of assembling a roof truss and wall stud framework according to claim 15 and further comprising the steps of;

temporarily securing the second portion of the tie-down strap to the preassembled roof truss prior to transportation of the truss to the second location; and releasing the second portion of the tie-down strap from the preassembled roof truss prior to the step of mounting the second portion to the wall stud framework;

whereby the second portion of the tie-down strap is contained during transportation of the truss from the first to the second location.

17. A method of assembling a roof truss and wall stud framework according to claim 15 wherein the first portion of the tie-down strap is mounted to one of the bottom chord and top chord by staples.

18. A method of assembling a roof truss and wall stud framework according to claim 15 wherein the first location is a first workstation in a manufacturing facility.

19. A method of assembling a roof truss and wall stud framework according to claim 18 wherein the second location is a manufactured home manufacturing facility.

20. A method of assembling a roof truss and wall stud framework according to claim 18 wherein the second location is a building site.

21. A method of assembling a roof truss and wall stud framework according to claim 18 wherein the second location is a second workstation in the manufacturing facility.

* * * * *

UNITED STATES PATENT AND TRADEMARK OFFICE
CERTIFICATE OF CORRECTION

PATENT NO. : 5,561,949
DATED : October 8, 1996
INVENTOR(S) : WAYNE M. KNOTH

It is certified that error appears in the above-indentified patent and that said Letters Patent is hereby corrected as shown below:

Column 8, claim 7, line 12:
 "lie" should be --be--.

Column 8, claim 10, line 39:
 after "chord" insert--,--.

Signed and Sealed this

Seventh Day of January, 1997

Attest:

BRUCE LEHMAN

*Attesting Officer*      *Commissioner of Patents and Trademarks*